United States Patent [19]

Baumhauer, Jr. et al.

[11] Patent Number: 5,651,074
[45] Date of Patent: Jul. 22, 1997

[54] NOISE CANCELING GRADIENT MICROPHONE ASSEMBLY

[75] Inventors: John Charles Baumhauer, Jr., Indianapolis; Larry Allen Marcus, Fishers, both of Ind.

[73] Assignee: Lucent Technologies Inc., Murray Hill, N.J.

[21] Appl. No.: 438,826

[22] Filed: May 11, 1995

[51] Int. Cl.$^6$ ............................................. H04C 25/00
[52] U.S. Cl. ...................... 381/170; 381/155; 381/168; 381/169
[58] Field of Search ........................... 381/155, 168, 381/169, 181, 154, 170, 88, 91, 157, 122, 71, 94; 379/433, 428, 387

[56] References Cited

U.S. PATENT DOCUMENTS 5,303,307  4/1994  Elko et al. .............................. 381/92
5,511,130  4/1996  Bartlett et al. .......................... 381/155

OTHER PUBLICATIONS

U.S. patent application by Charles Spurgeon Bartlett and Michael Anthony Zuniga, entitled "Single Diaphragm Second Order Differential Microphone Assembly", Ser. No. 08/237,798 filed on May 4, 1994.

U.S. patent application by Charles Spurgeon Bartlett and Michael Anthony Zuniga, entitled "Noise-Canceling Differential Microphone Assembly", Ser. No. 08;230,955 filed Apr. 21, 1994.

U.S. patent application by Charles Spurgeon Bartlett and Michael Anthony Zuniga entitled "Baffled Microphone Assembly", Ser. No. 08/333,671 filed Nov. 3, 1994.

JASA, vol. 58, No. , Jul. 1975, entitled "Second-Order Gradient Unidirectional Microphones Utilizing An Electret Transducer", authorized by G. M. Sessler and J. E. West.

JASA, vol. 22, No. 5, Sep. 1950, entitled "A Second-Order Gradient Noise Canceling Microphone Using A Single Diaphragm", authored by W. A. Beaverson and A. M. Wiggins.

*Primary Examiner*—Sinh Tran
*Attorney, Agent, or Firm*—Thomas Stafford

[57] ABSTRACT

An improved Broadside SOG microphone assembly is realized by employing a microphone assembly having at least three ports arranged in a non-colinear fashion with the at least three ports defining and being in a "gradient" plane and with both outer adjacent differential pair of ports aligned in a direction substantially toward a prospective talker's lips. Thus, the inner port(s) is always closer to the prospective talker's lips. Each outer differential pair of ports forms a dipole which yields a high spatial gradient and, hence, higher speech sensitivity since they are pointed substantially toward the prospective talker's lips. Just as important, as the prospective talker's lip position relative to the microphone varies, this alignment of each outer differential pair of ports will result in the least change in the dipole sensitivity and, therefore, the lowest Broadside SOG microphone position sensitivity. Another advantage of this arrangement is that it similarly has significantly reduced position sensitivity with angular departure from the nominal Broadside prospective talker's lip position, owing again to the orientation of the prospective talker's lips. In a preferred embodiment, a single FOG microphone element is employed which accepts four distinct acoustic signals from acoustic transmission lines from four distinct ports arranged in a non-colinear fashion. The four ports define and are in a "gradient" plane with both outer adjacent differential pair of ports aligned in a direction substantially toward the prospective talker's lips. Thus, the inner ports are always closer to the prospective talker's lips. Each outer differential pair of ports forms a dipole which yields a high spatial gradient and, hence, higher speech sensitivity since they are pointed in a direction substantially toward the prospective talker's lips. To this end, the outer ports are plus (+) ports and the inner ports are minus (−) ports, or vice versa, referring to each side of the FOG element's diaphragm.

16 Claims, 10 Drawing Sheets

NOISE CANCELING GRADIENT MICROPHONE ASSEMBLY

TECHNICAL FIELD

This invention relates to microphone assemblies and, more particularly, to noise canceling gradient microphone assemblies.

BACKGROUND OF THE INVENTION

Telephone handsets are often used in environments having significant acoustic background noise. When sensed by the telephone microphone, the acoustic background noise signal mixes with a prospective talker's signal, thus reducing the quality and intelligibility of the transmitted talker's signal. Such corrupted talker signals can also present special problems for new digital communications systems where speech coding and compression are utilized.

First-order gradient (FOG) microphones have been used in close-talking applications to discriminate against undesired acoustic background noise. Although, such FOG microphones have been useful in canceling acoustic background noise, an even greater level of acoustic background noise cancellation is desirable.

It is well known that second-order gradient (SOG) microphones can provide an even greater close-talking acoustic noise cancellation than the FOG microphones. SOG microphones often employ two spatially distinct FOG elements, the signals of which are electrically subtracted to obtain the desired second-order spatial differential (or "gradient"). In most prior known arrangements, the spatial sensing points, or "ports", are substantially along a straight line, i.e., they are colinear. Then, the pressure differential may be represented as $$\frac{\Delta^2 p}{(\Delta x)^2},$$

where p is the pressure and x is the coordinate along the X axis of the ports. Examples of such SOG microphones are disclosed by G. M. Sessler and J. E. West in an article entitled "Second Order Gradient Uni-Directional Microphone Utilizing An Electret Transducer", *JASA*, 58 (1975) pages 273–278, and in copending U. S. patent application Ser. No. 08/230,955, filed Apr. 21, 1994, and entitled "Noise-Canceling Differential Microphone Assembly". Alternatively, if the ports are not in a straight line but in a single plane, the pressure differential can be represented as $$\frac{\Delta^2 p}{\Delta x \Delta y}.$$

For example, see an article by W. A. Beaverson and A. M. Wiggins entitled "A Second-Order Gradient Noise Canceling Microphone Using A Single Diaphragm", *JASA*, 22 (1950) pages 592–601.

In general, the above SOG microphones achieve enhanced close-talking acoustic background noise cancellation. But, as compared to FOG and omni-directional microphones, they are generally known to have low sensitivity to speech, particularly, at low frequencies where signals from the various ports subtract more completely. This can yield a transmitted talker signal with poor signal-to-electrical noise ratio. Additionally, it has been required to balance the sensitivity and frequency response of the two FOG elements used in the arrangement disclosed in the U.S. patent application Ser. No. 08/230,955, noted above. SOG microphones are also known to be particularly sensitive to the positioning of the handset microphone with respect to the prospective talker's lips, e.g., with distance R from the lips. One solution to this problem is disclosed in U.S. Pat. No. 5,303,307 issued to Elko et al. on Apr. 12, 1994. More recently, the SOG (or more specifically "Broadside SOG") microphone assembly employing colinear ports described in the U.S. patent application Ser. No. 08/230,955, noted above, has made advances in these performance areas. However, further improvement is desirable to insure robust close-talking Broadside SOG microphone performance. A Broadside SOG microphone arrangement employing a single FOG element which eliminates the problems of balancing the FOG elements sensitivity and frequency response is disclosed in copending U.S. patent application Ser. No. 08/237,798, filed May 4, 1994, and entitled "Single Diaphragm Second-Order Differential Microphone Assembly". Another Broadside SOG microphone arrangement is disclosed in copending U.S. patent application Ser. No. 08/333,671, filed Nov. 3, 1994, and entitled "Baffled Microphone Assembly". In these disclosed arrangements the ports are again arranged substantially along a straight line, i.e., are colinear, and the important pressure differential is represented by $$\frac{\Delta^2 p}{(\Delta x)^2}.$$

Nevertheless, the ports associated with the outer (adjacent) differential ports (or "dipole") are separated by a solid baffle for the purpose of "shielding" the speech waves from the two inner, or the two outer, ports on the rear of the baffle. No arrangement is provided to allow the speech waves to arrive directly at all four ports without shielding via a baffle. This could present problems in certain design applications of their microphone.

SUMMARY OF THE INVENTION

Improvements on prior known close-talking Broadside SOG microphone arrangements in further reducing the position sensitivity and increasing acoustic speech sensitivity while still retaining the desired background noise cancellation are realized by employing a microphone assembly having at least three ports arranged in a non-colinear fashion with the at least three ports defining and being in a "gradient" plane and with both outer adjacent differential pair of ports aligned in a direction substantially toward a prospective talker's lips. Thus, the inner port(s) is always closer to the prospective talker's lips. Each outer differential pair of ports forms a dipole which yields a high spatial gradient and, hence, higher speech sensitivity since they are pointed substantially toward the prospective talker's lips. Just as important, as the prospective talker's lip position relative to the microphone assembly varies, this alignment of each outer differential pair of ports will result in the least change in the dipole sensitivity and, therefore, the lowest Broadside SOG microphone position sensitivity. Another advantage of this arrangement is that it similarly has significantly reduced position sensitivity with angular departure from the nominal Broadside prospective talker's lip position, owing again to the orientation of the prospective talker's lips.

In a preferred embodiment, a single FOG microphone element is employed which accepts four distinct acoustic signals from acoustic transmission lines from four distinct ports arranged in a non-colinear fashion. The four ports define and are in a "gradient" plane with both outer adjacent differential pair of ports aligned in a direction substantially toward the prospective talker's lips. Thus, the inner ports are always closer to the prospective talker's lips. Each outer differential pair of ports forms a dipole which yields a high spatial gradient and, hence, higher speech sensitivity since they are pointed in a direction substantially toward the prospective talker's lips. To this end, the outer ports are plus (+) ports and the inner ports are minus (−) ports, or vice versa., referring to each side of the FOG element's diaphragm.

DETAILED DESCRIPTION

Figure 1:
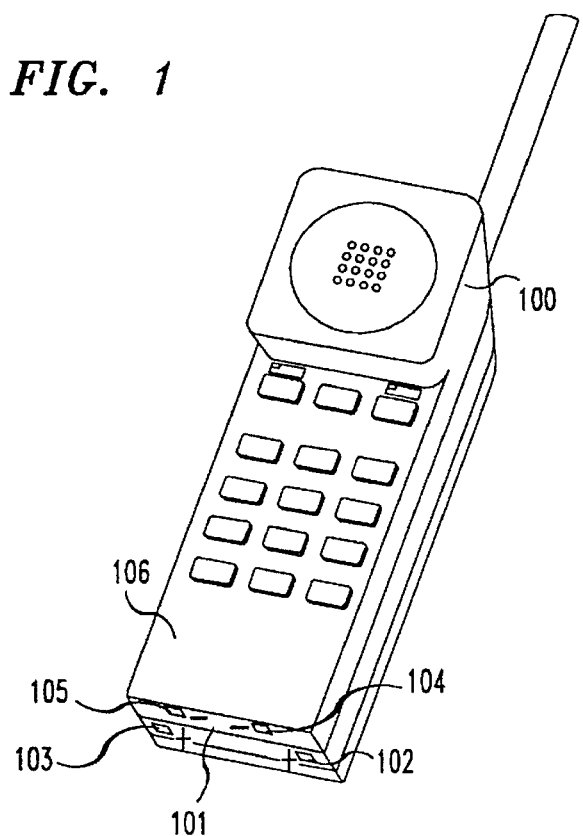
FIG. 1 is a schematic, perspective view of, for example, a cellular telephone handset including an embodiment of the invention utilizing a four port microphone assembly.

FIG. 1 is a perspective view of, for example, cellular handset (housing) 100 including a microphone assembly incorporating the invention. As shown, there are two outer ports 102 and 103 and two inner ports 104 and 105 on surface 101 of handset 100 for admission of acoustic energy, i.e., sound. As will be explained in greater detail below, it is noted that the inner ports 104 and 105 in conjunction with outer ports 102 and 103 are arranged in a non-colinear port microphone assembly. Additionally, the inner ports 104 and 105 form with outer ports 102 and 103, respectively, dipoles that are pointed in a direction away from surface 106 along surface 101 of handset 100, which is in a direction substantially toward a prospective talker's lips. As shown in FIG. 1, the outer ports 102 and 103 have been labeled plus (+) and the inner ports 104 and 105 have been labeled minus (−). It will be apparent that the outer ports could be labeled minus (−) and the inner ports could be labeled plus (+). Additionally, it should be noted that surface 101 does not have to be perpendicular to surface 106 of handset 100 and, in certain applications, it could be contoured. Furthermore, it should be noted that the acoustic sound field of a talker has free uninhibited access to all of the ports 102 through 105. That is, the acoustic sound field is not shielded by a baffle or the like from entering any of the ports 102 through 105. Thus, it is seen that the line between the (+) and (−) ports forming each dipole is substantially unobstructed for access of the acoustic sound, (acoustic energy) field, i.e., comprises free space.

Figure 2:
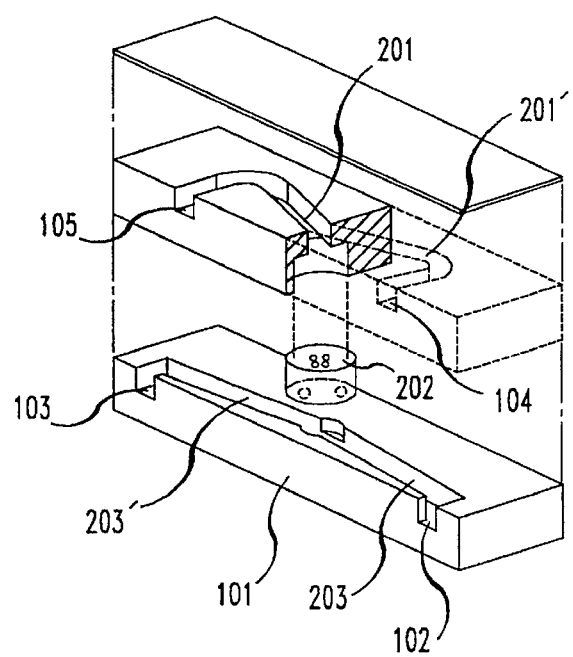
FIG. 2 is an exploded schematic, perspective view of the bottom of surface 101 and illustrates the details of the microphone assembly shown in FIG. 1.

FIG. 2 is an exploded schematic, perspective view of a section of the microphone assembly shown in FIG. 1. The elements shown in FIG. 2 which are identical to those shown in FIG. 1 have been similarly numbered. Specifically, outer ports 102 and 103 and inner ports 104 and 105 are shown on surface 101. Sound entering inner port 105 is transported via acoustic transmission line, i.e., tube, conduit or the like, 201 to a first side of microphone element 202. Similarly, sound entering inner port 104 (shown in dashed outline) is transported to the first side of microphone element 202 via an acoustic transmission line 201' (also shown in dashed outline) which is similar to transmission line 201 but being the mirror image thereof. Microphone element 202 is a FOG microphone element, preferably of a bi-directional type, well known in the art, for example, an electret transducer. Sound entering outer ports 102 and 103 is transported to a second side of microphone element 202 via acoustic transmission lines 203 and 203', respectively, which are of equal length. It is noted, that in this embodiment the dimensions of the acoustic transmission lines for the inner ports 104 and 105 are equal to each other and are substantially equal to the acoustic transmission lines transporting sound entering outer ports 102 and 103 to microphone element 202. Again, the dimensional relationship of the outer ports 102 and 103 and inner ports 104 and 105, will be described in greater detail below in relationship to FIG. 10. It should be noted that each acoustic transmission line and associated port yield a "fundamental" acoustic resonant frequency above 3600 Hz and none below 3600 HZ. This relatively high "Q" peak in the acoustic frequency response must be filtered if in, or close to, the bandwidth of interest, notably 200–3300 Hz for telephony. Additionally, the two outer ports on the gradient plane of the microphone are connected to one another, and communicate to one side of the microphone element 202 with an acoustic transmission line that is substantially straight. It is further noted that by keeping the resonant frequency of the acoustic transmission lines and associated ports above 3600 Hz puts an upper band on the transmission line length. This eliminates the need for complex filtering in telephony and similar bandwidth applications. Thus, for prescribed d1 and d2 dimensions and hence performance, the tube lengths must be minimized. This is realized in our inventive microphone in the most efficient way by offset "αd2". Consequently, a resonant frequency is obtained at 3700–4000 Hz, whereas known prior art arrangements have a resonant frequency at 3500 Hz. It is further noted that the ports and tubes do not have to be rectangular in shape. The equal physical length tubes are sufficient to provide optimum performance, however, the main requirement is to simply match the fundamental acoustic resonant frequency associated with the tubes and their associated ports.

Figure 3:
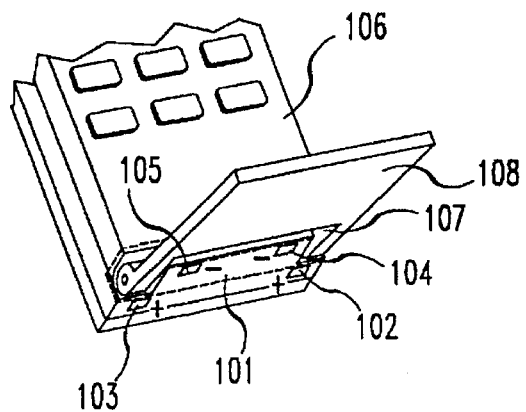
FIG. 3 is another schematic, perspective view of a portion of a handset employing the microphone assembly shown in FIG. 1.

FIG. 3 is another schematic, perspective view of a portion of a handset employing the inventive microphone assembly shown in FIG. 1. The elements of FIG. 3 which are identical to those shown in FIG. I have been similarly numbered and, therefore, will not be described again in detail. The only difference being that optional flip lid 108 shown in FIG. 3 has been included. Flip lid 108, however, is not required for the proper functioning of our inventive microphone assembly. Additionally, it should be noted that flip lid 108 does not contain any of the microphone assembly ports or transmission lines, i.e., tubes and that there is a gap 107 between flip lid 108 and surface 106 to allow for clearance for lid 108 to close and open.

Figure 4:
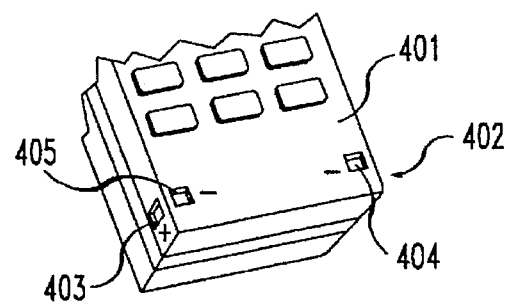
FIG. 4 is a schematic, perspective view of a portion of a handset employing a second embodiment of a microphone assembly incorporating the invention.

FIG. 4 is a schematic, perspective view of a portion of a handset employing a second embodiment of a microphone assembly incorporating the invention. As shown in this embodiment, inner ports 404 and 405 are on surface 401 of the handset while the outer ports 402 (not shown) and 403 are on the right and left sides, respectively, of the handset. Thus, as seen the inner ports 404 and 405 and outer ports 402 and 403 are positioned on planes substantially perpendicular to each other and, hence, are not on the same plane. Additionally, the planes that the inner ports and outer ports are on do not have to be parallel to each other. Ports 402 through 405 are arranged in this embodiment to provide the same dimensional relationship as ports 102, 103, 104 and 105 of FIG. 1. It will be apparent to those skilled in the art that the acoustic transmission lines, i.e., tubes, supplying the acoustic energy from the ports 401 through 404 to a microphone element will be configured somewhat differently from those shown in FIG. 2. Again, the significance of the dimensional relationship of the ports will be described in greater detail below in relationship to FIG. 10.

Figure 5:
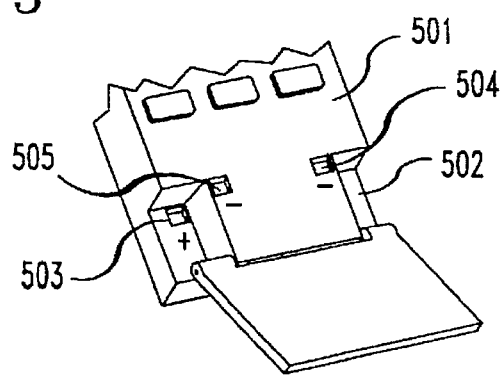
FIG. 5 is a schematic, perspective view of a portion of a handset employing a third embodiment of a microphone assembly incorporating the invention.

FIG. 5 is a schematic, perspective view of a portion of a handset employing a third embodiment of a microphone assembly incorporating the invention. As shown in this embodiment, inner ports 504 and 505 are on surface 501 of the handset while outer ports 502 (not fully shown) and 503 are located on surfaces recessed from surface 501 of the handset. However, ports 502 through 504 are arranged to provide the same dimensional relationship as ports 102, 103, 104 and 105 of FIG. 1. Again, the significance of the dimensional relationship of the ports will be described in greater detail below in relationship to FIG. 10.

Figure 6:
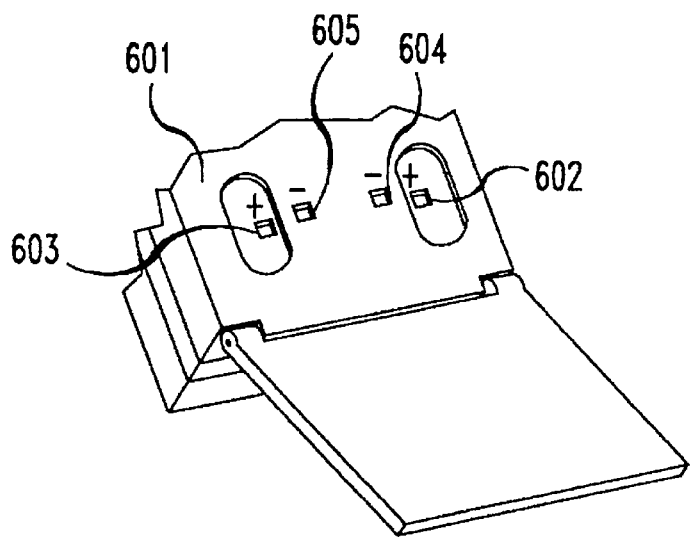
FIG. 6 is a schematic, perspective view of a portion of a handset employing a fourth embodiment of a microphone assembly incorporating the invention.

FIG. 6 is a schematic, perspective view of a portion of a handset employing a fourth embodiment of a microphone assembly incorporating the invention. As shown in this embodiment, inner ports 604 and 605 are on surface 601 of the handset, while the outer ports 602 and 603 are recessed from surface 601 of the handset. Ports 602 through 604 are arranged in this embodiment to provide the same dimensional relationship as ports 102, 103, 104 and 105 of FIG. 1. Again, the significance of the dimensional relationship of the ports will be described in greater detail below in relationship to FIG. 10.

Figure 7:
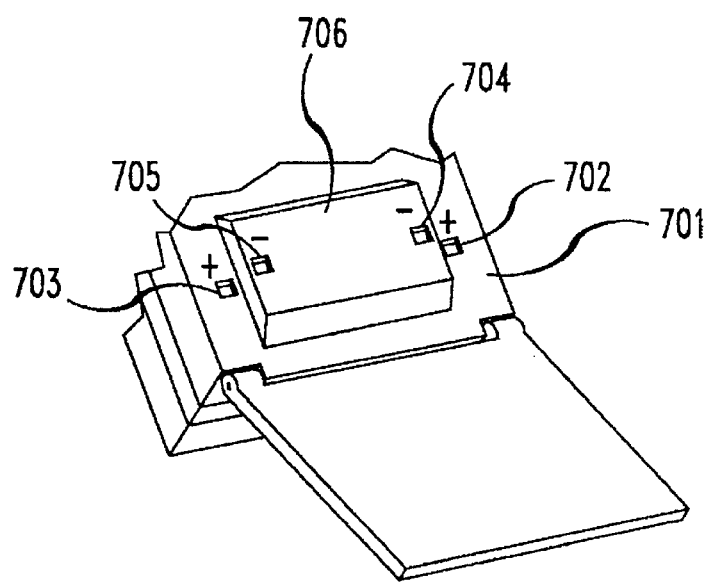
FIG. 7 is a schematic, perspective view of a portion of a handset employing a fifth embodiment of a microphone assembly incorporating the invention.

FIG. 7 is a schematic, perspective view of a portion of a handset employing a fifth embodiment of a microphone assembly incorporating the invention. As shown in this embodiment, outer ports 702 and 703 are on surface 701 of the handset, while the inner ports 704 and 705 are on raised surface 706 of the handset. Ports 702 through 704 are arranged in this embodiment to provide the same dimensional relationship as ports 102, 103, 104 and 105 of FIG. 1. Again, the significance of the dimensional relationship of the ports will be described in greater detail below in relationship to FIG. 10.

For the embodiments shown in FIGS. 4 through 7, it is noted that the plane containing both the (+) and (−) ports is not necessarily normal to the surface 106 of the handset. Moreover, the surfaces containing the inner minus (−) ports and the outer plus (+) ports do not necessarily have to be parallel and can be at some angle relative to each other, which angle is of secondary importance.

Figure 8:
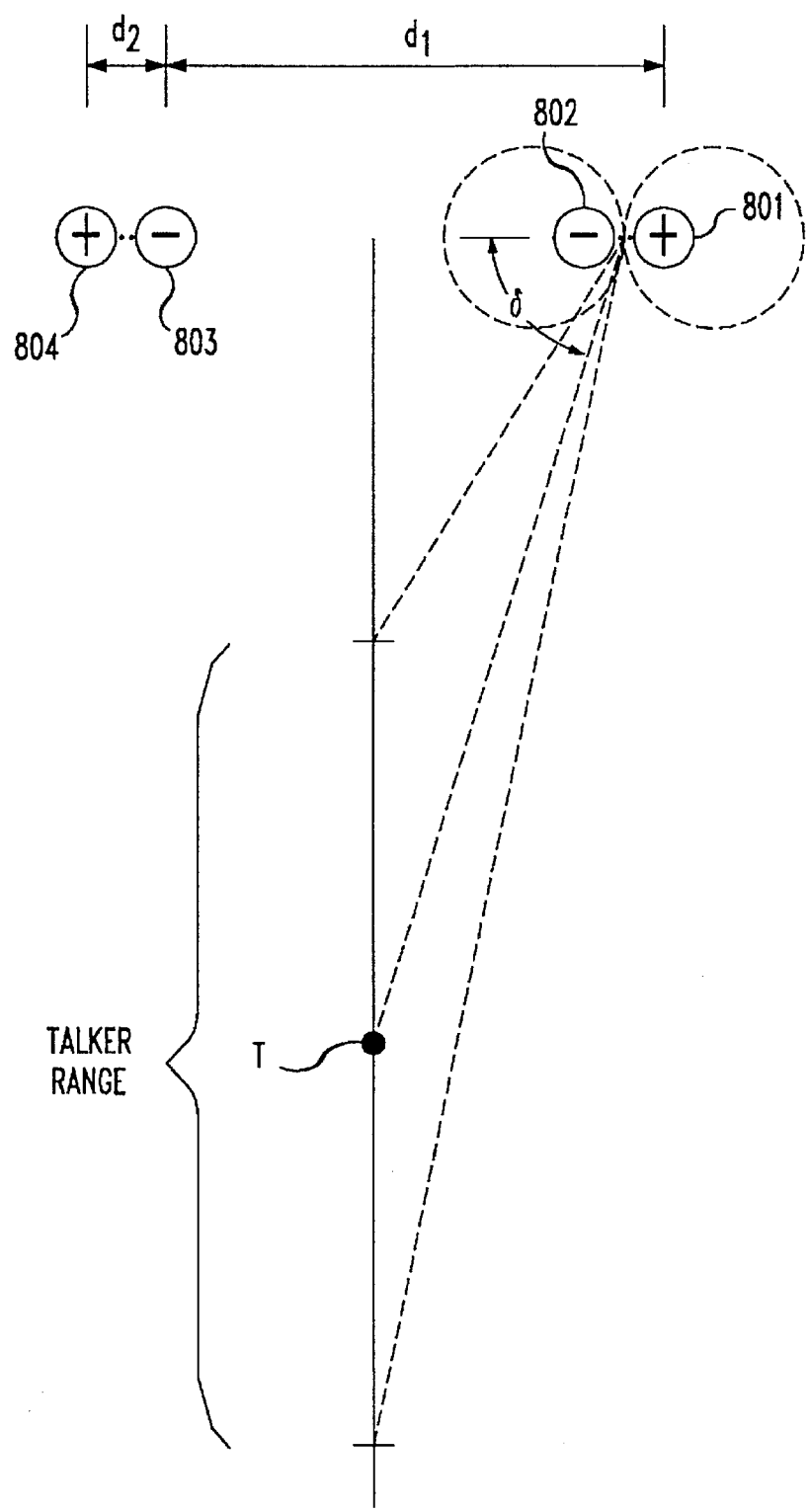
FIG. 8 is a representation of a prior art Broadside SOG microphone assembly having the ports arranged in a colinear manner and which illustrates the affect the orientation of the outer differential pairs of ports, i.e., dipoles, has on microphone sensitivity and variation with positioning of the prospective talkers lips.

FIG. 8 is a representation of a prior art microphone assembly having the ports arranged in a colinear manner and which shows the position variation of a talker relative to the outer pairs of ports. As shown, ports 801, 802, 803 and 804 are arranged in a colinear manner. The two outer pairs of ports, specifically, 801 and 802, and 803 and 804 form FOG dipoles which contribute to the overall microphone assembly. The polar directivity pattern associated with each dipole is essentially a "figure-8" pattern shown in dashed outline and is aligned along the plus-to-minus direction, i.e., along the horizontal axis. It is noted that a similar polar directivity pattern is associated with ports 803 and 804 but is not shown for clarity of exposition. The speech wave approaching the handset from the nominal talker lip position T is seen to approach each dipole at an angle δ, as shown, which is relatively close to 90 degrees. In the example shown, the angle δ is approximately 73 degrees. Because the nominal angle δ for the nominal talker position T is far from the δ=0 peak of the polar directivity pattern the output sensitivity of the dipoles and, thus, of the prior art Broadside SOG microphones is not as high as can be. As the nominal talker position T varies within the talker range shown, on the vertical axis, the angle delta is seen to vary. Because this variation occurs relatively close to the 90 degree null of the figure-8 polar directivity pattern of the dipoles a relatively large variation in the output of the Broadside SOG microphone is encountered. Note that the dimensions d1 and d2 of this prior art arrangement were selected to be the same dimensions used in the inventive microphone assembly, as shown in FIGS. 9 and 10, so that a comparison could be made between this prior art arrangement and the preferred embodiment of the invention.

Figure 9:
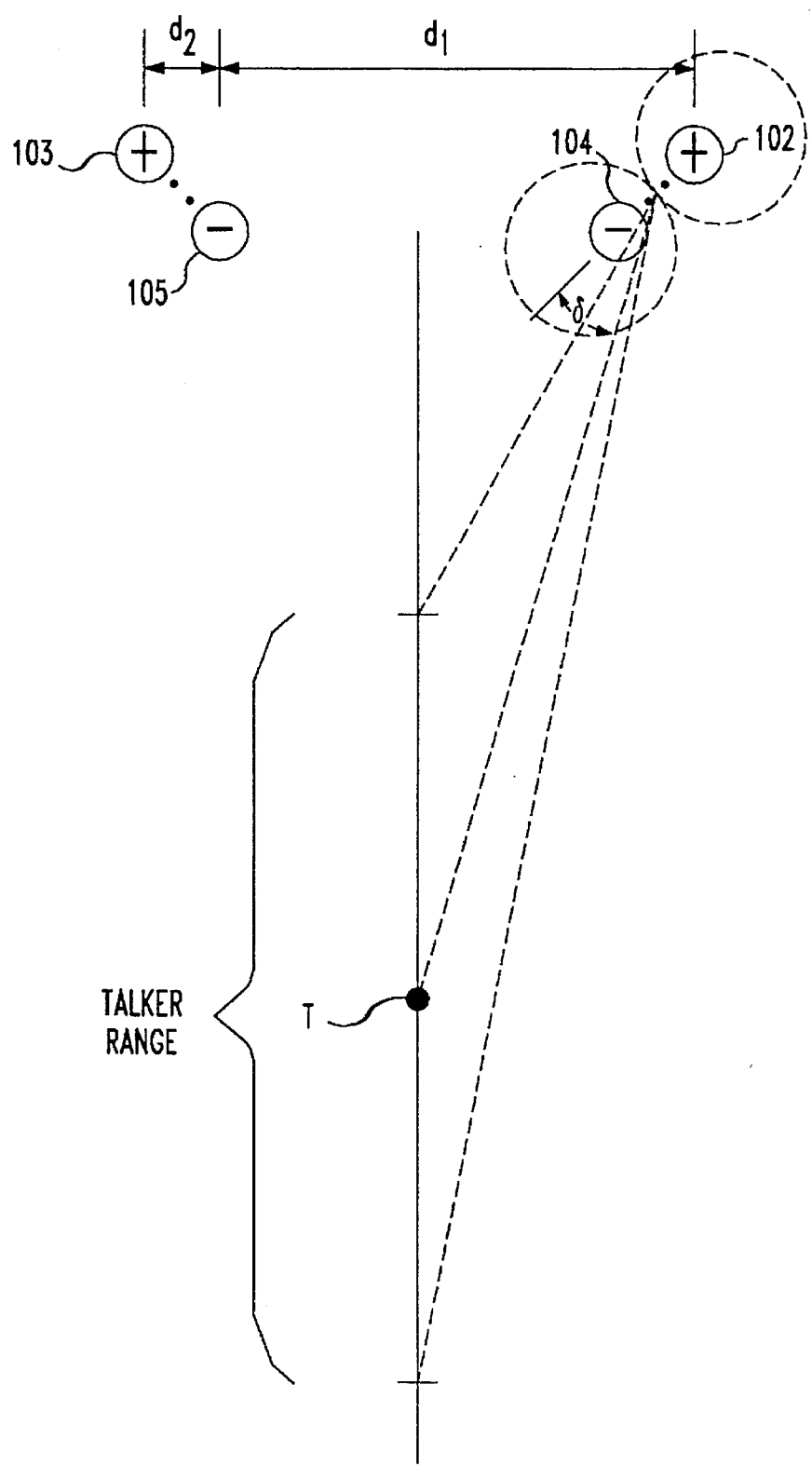
FIG. 9 is a representation of an embodiment of the inventive microphone assembly having the ports arranged in a non-colinear manner and which illustrates the affect the orientation of the outer differential pairs of ports, i.e., dipoles, has on microphone sensitivity and variation with positioning of the prospective talkers lips.

FIG. 9 is a representation of an embodiment of the inventive microphone assembly having the ports arranged in a non-colinear manner as shown in FIGS. 1, and 3 through 7, and which shows the position variation of a talker relative to the outer pairs of ports, each of the outer pairs of ports 102 and 104 and 103 and 105 form a dipole. An axis of each such dipole passes through the center of the ports from it. As shown, ports 102, 104, 105 and 103 are arranged in a non-colinear manner. The two outer pairs of ports, specifically, 102 and 104, and 105 and 103 form FOG dipoles which contribute to the overall microphone assembly. The polar directivity pattern associated with each dipole is essentially a figure-8 pattern and is aligned along the plus-to-minus direction, as shown in dashed outline. It is again noted that only one of the polar directivity patterns is shown for clarity of exposition. The speech approaching each dipole from the nominal talker lip position T is seen to approach each dipole at an angle δ, as shown, which in this example is approximately 28 degrees. Since the nominal angle δ from the nominal talker position T, which equals 28 degrees in this embodiment, is relatively close to the δ=0 peak of the figure-8 polar directivity pattern the output sensitivity of the dipoles and thus Broadside SOG microphone is near its optimum output sensitivity level. As the nominal talker lip position T varies within the talker range shown, on the vertical axis, the angle δ is seen to vary. Because this variation is seen to occur about an angle δ which is relatively close to the δ=0 peak of the dipole directivity pattern, it does not cause as large a variation in the output sensitivity of the dipoles and the resulting Broadside SOG microphone. This results in low position sensitivity in the Broadside SOG microphone. This results in high signal-to-electrical noise ratio. Note that the scale of FIG. 9 is double the actual scale for clarity of exposition.

Figure 10:
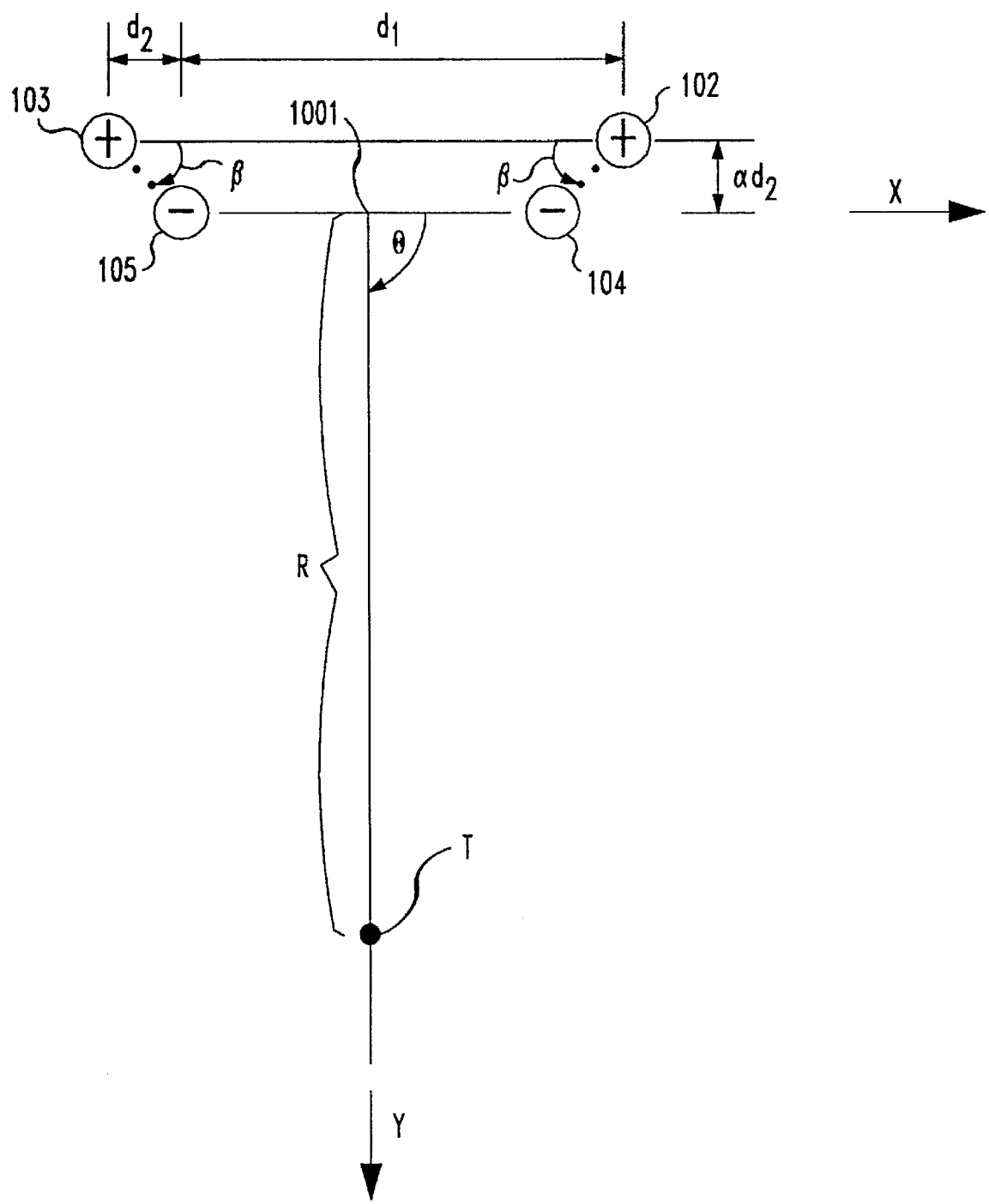
FIG. 10 illustrates the dimensional relationships of the ports of the microphones shown in FIGS. 1, and 3 through 7 which is useful in describing the invention.

FIG. 10 illustrates the dimensional relationships of the ports of the microphones shown in FIGS. 1, and 3 through 7, which is useful in describing the invention. As indicated above, the Broadside SOG microphone ports 102, 104, 105 and 103 are arranged in a non-colinear manner, as shown. It is noted, that the inner ports 104 and 105 are in a position closer to the talker lip position T. These four ports, namely, 102 through 105 are on and define a "gradient plane" which is oriented toward talker lip position T. In this example, the X axis is defined as going through inner or minus (−) ports 104 and 105 and the Y axis is defined as being orthogonal to the X axis. The origin of the X and Y coordinates is located at point 1001 halfway between ports 104 and 105. The orthogonal Y axis extends from the origin at point 1001 through the talker lip position T. The separation along the X axis of each dipole formed by ports 102 and 104, and ports 103 and 105 is shown as d2. Distance d1 is the distance along the X axis between outer port 102 and inner port 105. It can be seen that distance d1 is also the distance along the X axis between the center of gravity of each dipole formed by ports 102 and 104, and ports 103 and 105. Each dipole is oriented at an angle β with respect to the X axis such that the four ports 102 and 104, and 103 and 105 are arranged in a non-colinear fashion. The plus (+) or outer ports 102 and 103 are thus positioned at Y=−αd2. Thus, the separation along the Y axis between the plus (+) and minus (−) ports of each dipole is hence αd2. It can be seen that space tanβ=α. The angle θ measures the angular orientation of the talker lip position T with respect to the positive X axis. This angular coordinate θ will be useful in considering the near and far-field polar directivity pattern of the inventive Broadside SOG microphone. Note that θ=90° is defined as the "Broadside" direction. The distance R shown in this example along the Y axis measures the critical distance from the talker lip position T to the origin of the Broadside SOG microphone. In one example, not to be construed as limiting the scope of the invention, R=2", d1=1.25", d2=0.2" (where " denotes inches) and α=1. Note that the dimensional scale of FIG. 10 is double the actual scale for clarity of exposition. For these preferred dimensions, β=β_p is 45 degrees. For other embodiments, these dimensions may vary and, hence, β_p may vary also. In general, the preferred β_p can be defined as $$\beta_p \approx \tan^{-1}\left(\frac{2R}{d1}\right) - 27.5,$$

degrees. It is contemplated that for other embodiments employing other than the preferred β_p obtained from the above equation, β should be bounded by a minimum of β=10 degrees and a maximum of β=90 degrees. This is because beyond those limits the advantage discussed in FIG. 9 in having an angle δ relatively close to zero will not be obtained. Of course, if the optimum advantages afforded by this invention are to be obtained, one must use the preferred value of β_p. Additionally, it should be noted that in order to realize the advantages of this invention ports 102 through 105 are paired such that they are (+), (+) and (−), (−). As indicated above, both inner ports could be (+), (+) and both outer ports could be (−), (−).

Figure 11:
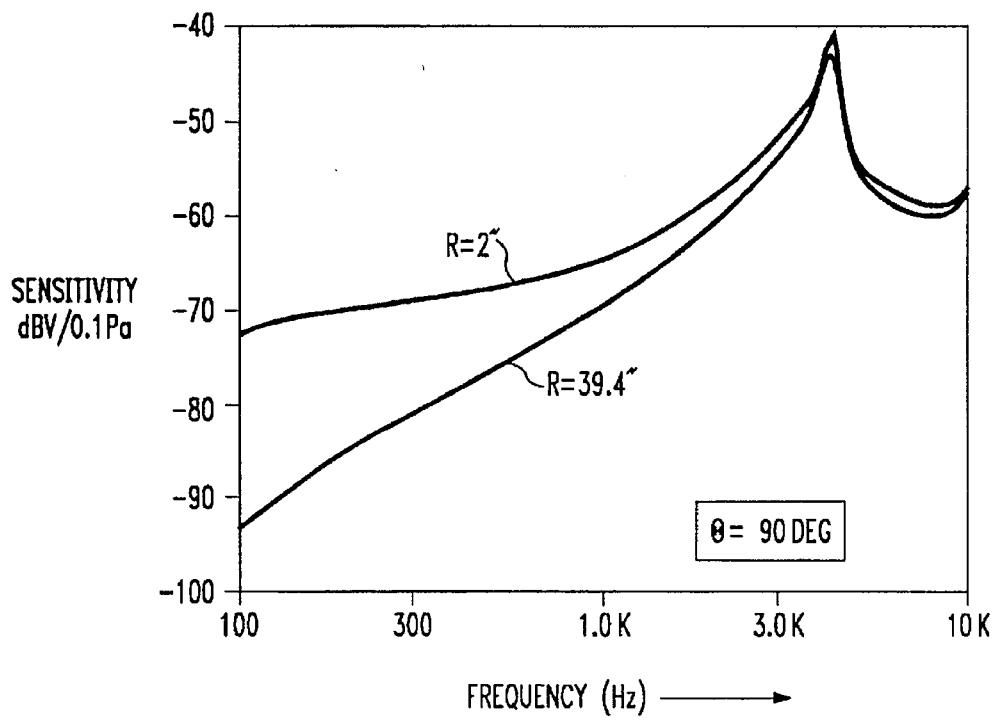
FIG. 11 is a graphical representation of the output sensitivity to near-field speech and noise verses frequency of the Broadside SOG microphone shown in FIG. 1.

FIG. 11 is a graphical representation of the output sensitivity versus frequency of the Broadside SOG microphone shown in FIG. 1. The sensitivity is expressed in units of dBV/0.1 Pa and frequency in Hertz (Hz). This data is shown for both the talker at distance R=2" and θ=90 degrees, i.e., the near-field speech source, and for a far-field noise source at distance R=39.4" (1 meter) and θ=90 degrees. In both cases, the acoustic sources at distance R are calibrated to deliver the same sound pressure amplitude at the origin of the Broadside SOG microphone at all frequencies. The distance between the two curves at each and every frequency is defined as the "on-axis" (θ=90 degrees, or Broadside) noise cancellation. It is seen that this on-axis noise cancellation is highly frequency dependent which is a characteristic of all close talking gradient type microphones. The greatest value of noise cancellation is seen to occur at lower frequencies. Fortunately, most background noise spectra are predominant at lower frequencies. Specifically, data shows the on-axis noise cancellation for the inventive Broadside SOG microphone to be 8 dB and 3 dB at 500 and 2000 Hz, respectively. The peak at 4000 Hz is largely due to standing waves in the tubes transporting the sound from the ports to the microphone element. The talker sensitivity for R=2" at 1 KHz is seen to be −65 dBV/0.1 Pa. This level is more than 10 dB above that which would be obtained from the prior art Broadside SOG microphone having similar d1 and d2 distances as preferred herein. This high output sensitivity and, thus, signal-to-electrical noise ratio is only about 3–4 dB below that of FOG microphones, which have been successfully used in commercial products. This high output sensitivity is one of the main advantages of our inventive Broadside SOG microphone over prior art Broadside SOG microphones.

Figure 12:
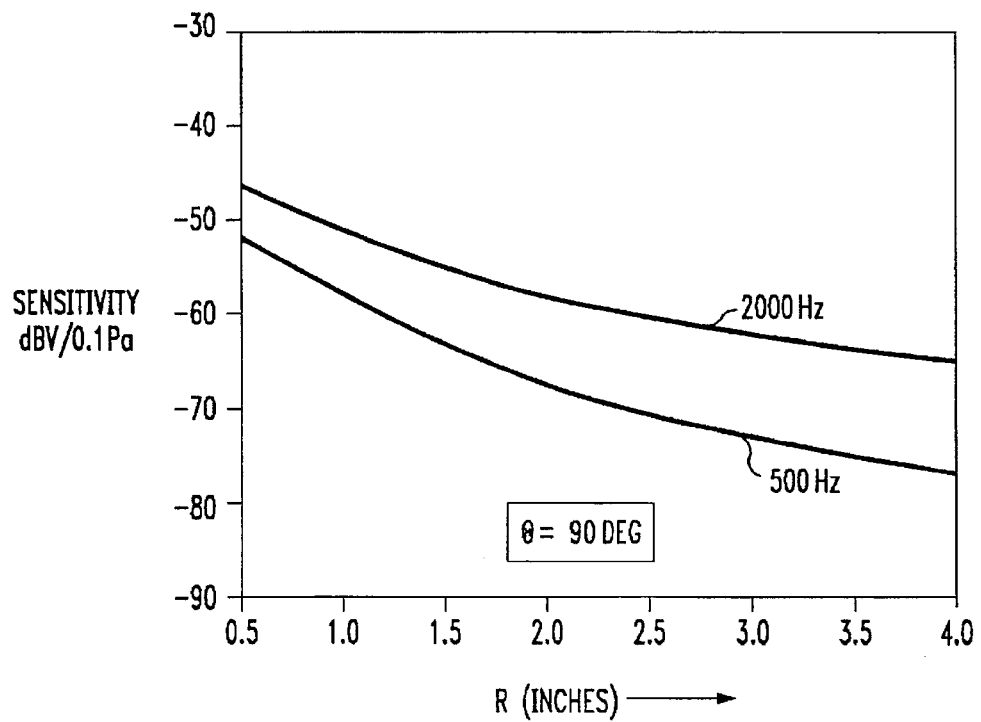
FIG. 12 is a graphical representation of the output sensitivity of the Broadside SOG microphone verses talker lip distance R from the microphone shown in FIG. 1.

FIG. 12 is a graphical representation of the output sensitivity of the Broadside SOG microphone verses talker lip distance R from the microphone shown in FIG. 1. As mentioned previously, the change in output sensitivity of Broadside SOG microphones with both distance R from the prospective talker's lips and the lip angular orientation θ with respect to the microphone, is known to be a limitation in prior Broadside SOG microphone assemblies. These two variations can collectively be defined as the position sensitivity of the Broadside SOG microphone. FIG. 12 shows position sensitivity verses R in inches, at Broadside, i.e., θ=90 degrees and frequencies of 500 and 2000 Hz. R nominal in this data has been chosen at 2 inches. Since, actual variations in R about this nominal value will depend on handset physical design, as well as, user preferences and habits, we choose here to characterize position sensitivity change over 2±1 inch. From this data it can be seen that the drop in output sensitivity in going from 1 to 3 inches is 15 dB at 500 Hz. The position sensitivity achieved with our inventive Broadside SOG is almost as low as that typical of FOG microphones (13–14 dB). It should be noted, that since sound pressure from a spherical acoustic source such as the human lips falls off approximately as 1/R, even in omnidirectional microphones would have an output sensitivity drop over this range of 9.5 dB at all frequencies. These sensitivity drops for this inventive embodiment compare well with data for prior art Broadside SOG microphones having similar d1 and d2, and R. Namely, the prior art Broadside SOG microphone output sensitivity would drop about 18 dB or more at 500 Hz, over the range of 1 to 3 inches. Thus, it is seen that this embodiment of our inventive Broadside SOG microphone invention is less sensitive to distance variations to the prospective talker's lips.

Figure 13:
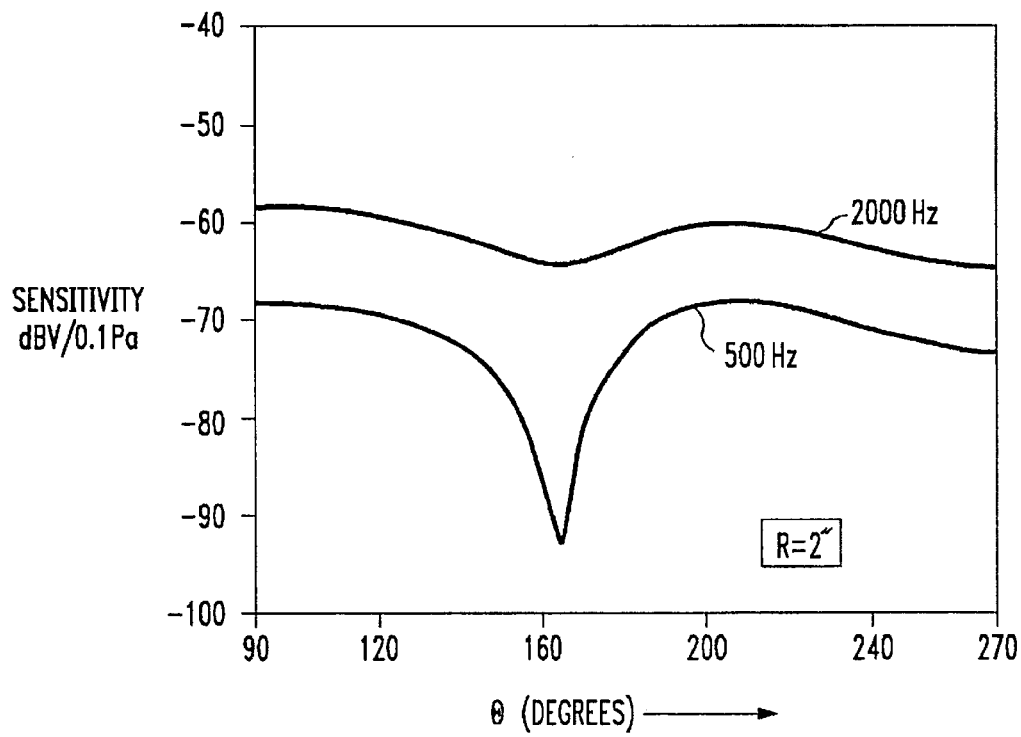
FIG. 13 is a graphical representation of the output sensitivity of the Broadside SOG microphone verses the angular orientation θ of a prospective talker's lips at distance R=2" from the microphone shown in FIG. 1.

FIG. 13 is a graphical representation of the output sensitivity of the Broadside SOG microphone shown in FIG. 1 verses the angular orientation θ of a prospective talker's lips at R=2" at 500 and 2000 Hz. This data demonstrates another advantage of the inventive SOG microphone. Namely, reduced angular position sensitivity. For constant R, let us define the angular position sensitivity as the angular departure from the nominal talker orientation at θ=90 degrees, where the output sensitivity drops by 3 dB. Hence, this is seen to occur at an angular departure of about +45 degrees at 500 Hz (note that there is a mirror image of this characteristic around 90 degrees). In comparison, the prior art Broadside SOG microphone assembly as shown in FIG. 8, with similar dimensions d1, d2 and R, as our inventive Broadside SOG microphone would have corresponding 3 dB points at about ±25 degrees at 500 Hz. This comparison thus demonstrates that the angular position sensitivity of our inventive Broadside SOG microphone has been improved, i.e., the sensitivity change with angle, is lower. This angular position sensitivity improvement should be viewed in light of the complimentary radial sensitivity improvement shown in FIG. 12.

Figure 14:
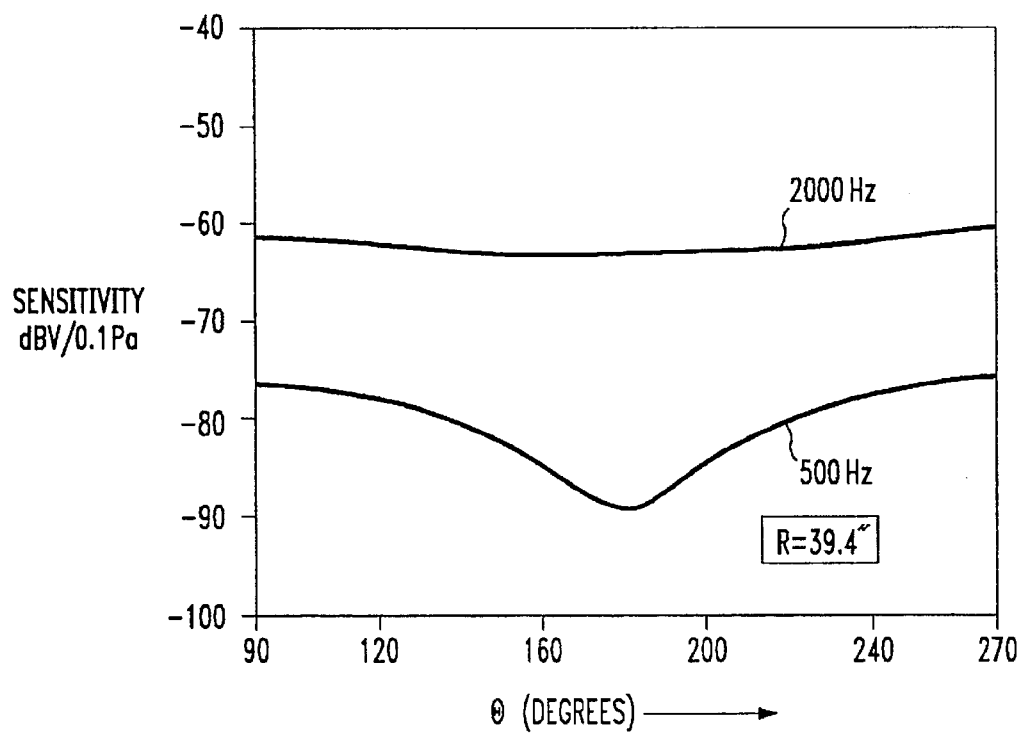
FIG. 14 is a graphical representation of the output sensitivity of the Broadside SOG microphone verses the angular orientation θ of a noise source at distance R=39.4" (1 meter) from the microphone shown in FIG. 1.

FIG. 14 is a graphical representation of the output sensitivity of the Broadside SOG microphone shown in FIG. 1 verses the angular orientation 13 of a noise source of R=39.4" (1 meter) at frequencies of 500 and 2000 Hz. Earlier in FIG. 11, we saw the on-axis noise canceling improvement of our inventive Broadside SOG microphone invention, that axis being 90 degrees. The data in FIG. 14 shows at various frequencies, the relative sensitivity of our inventive Broadside SOG microphone compared to the far-field source at θ=90 degrees referenced earlier. Clearly, then the total noise canceling value of the SOG microphone, assuming a random incident or diffuse noise field approaching the Broadside SOG microphone, is greater than that which was seen in FIG. 11. A measure called the directivity index (DI) can be obtained directly from the data in FIG. 14 at each frequency, which shows the additional noise canceling provided by the Broadside SOG microphone over and above the on-axis contribution shown in FIG. 14. The directivity index for this data is approximately 5 dB and 2 dB for 500 and 2000 Hz, respectively. Thus, the total noise canceling value of our Broadside SOG microphone is 13 dB and 5 dB at 500 and 2000 Hz, respectively. This compares closely with the total noise canceling values for the prior art Broadside SOG microphone shown in FIG. 8, having similar d1, d2 and R as our inventive Broadside SOG microphone.

Figure 15:
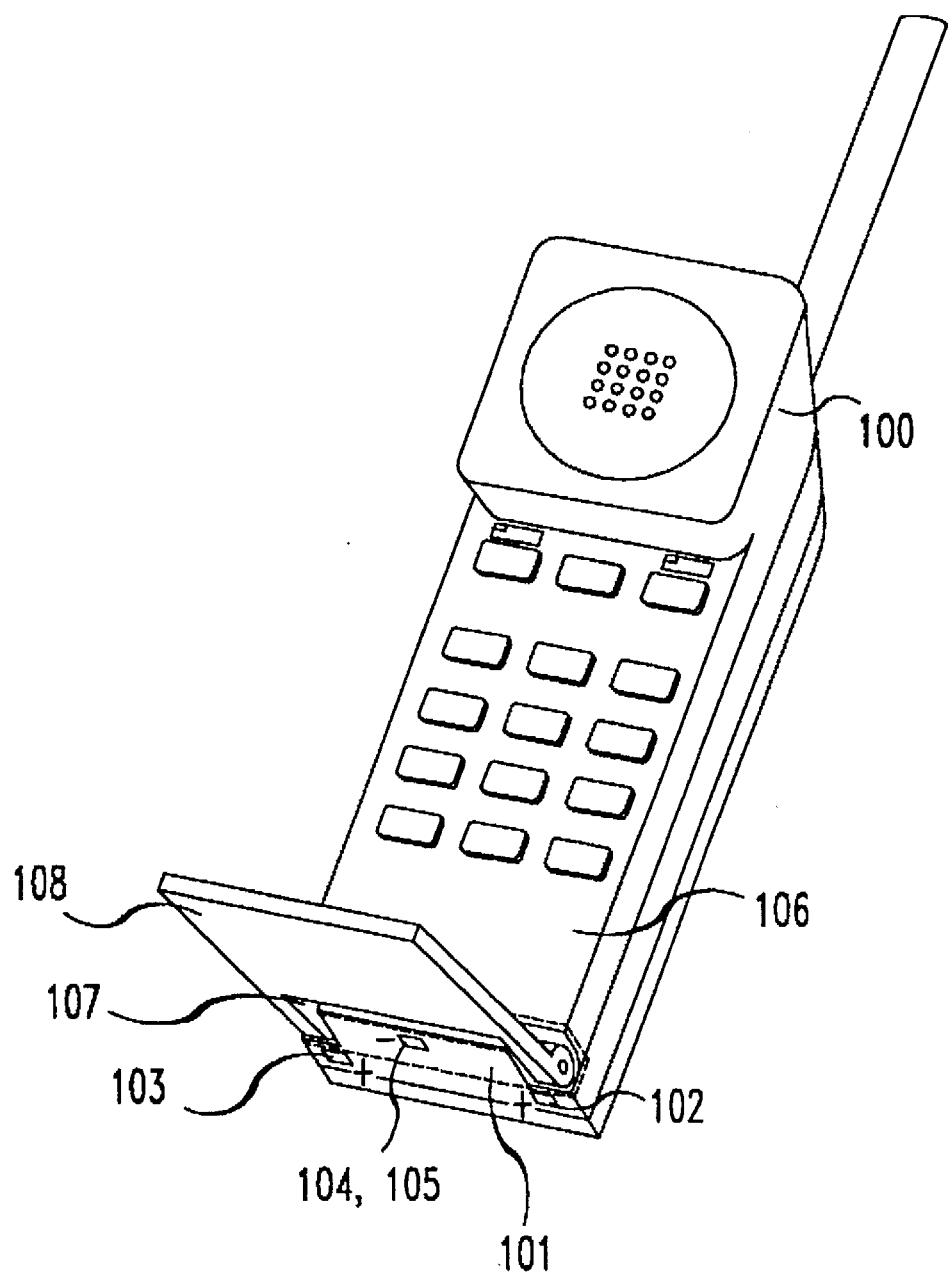
FIG. 15 is a schematic, perspective view of, for example, a cellular telephone handset including another embodiment of the invention utilizing a three port microphone assembly.

FIG. 15 is a schematic, perspective view of, for example, a cellular telephone handset including another embodiment of the invention utilizing a three port microphone assembly. It is a special case of that shown in FIG. 1 whereby both inner (−) ports 104 and 105 are co-located. Naturally, the ports and their corresponding transmission lines must be such that all tubes have the same length. In order to achieve this, adjustments would have to be made to the tubes in the structure shown in FIG. 2.

Figure 16:
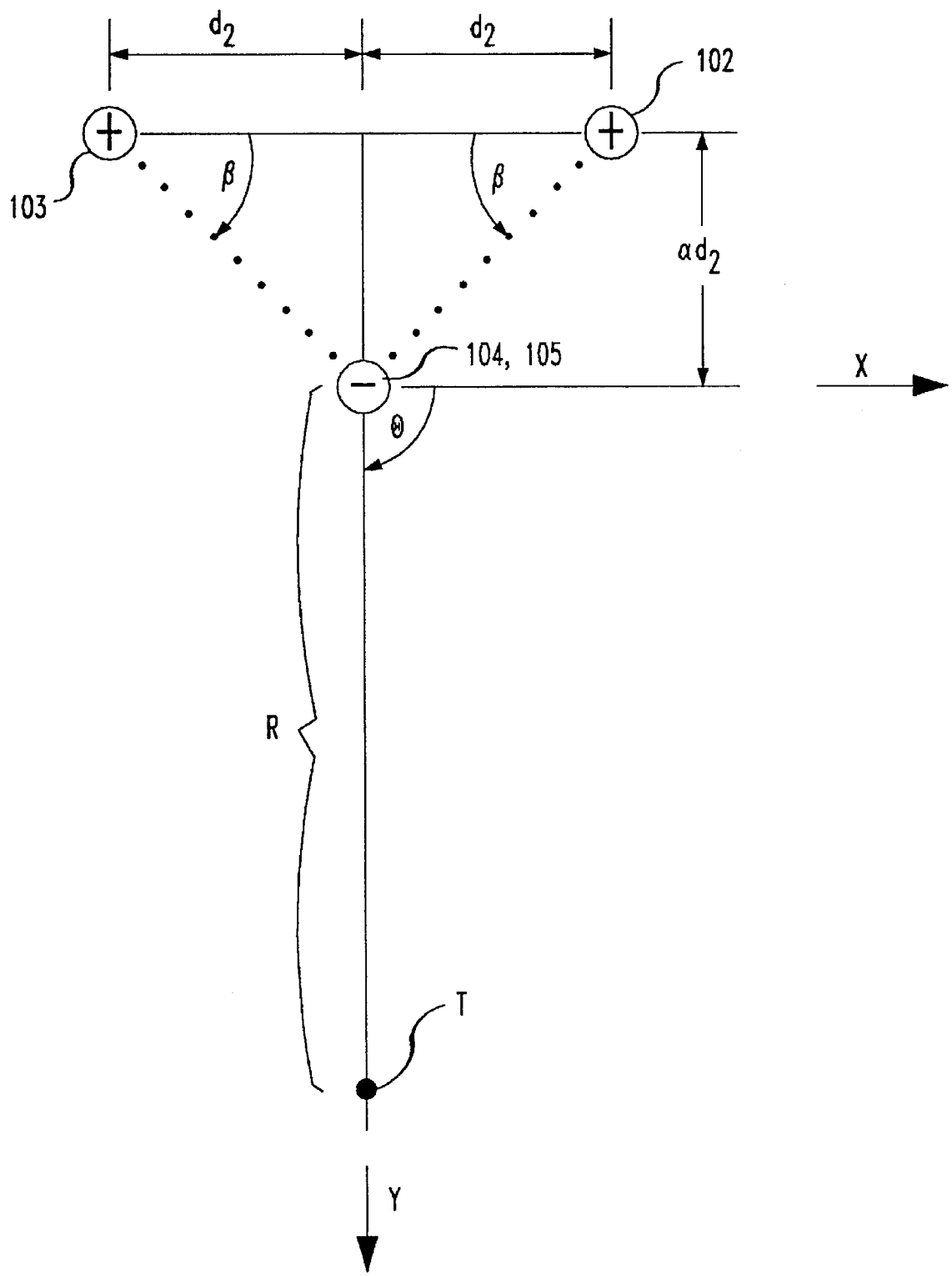
FIG. 16 illustrates the dimensional relationships of the three ports of the microphone assembly shown in FIG. 15 which are useful in describing the invention.

FIG. 16 illustrates the dimensional relationships of the three ports of the microphone assembly shown in FIG. 15 which are useful in describing the invention. Note that the main difference in FIG. 16, as compared to FIG. 10 is the value of d2 and that there is no d1.

Although the invention has been explained using a single FOG microphone element, it will be apparent that other arrangements may also be employed without departing from the spirit or scope of the invention. For example, two FOG microphone elements, four omni-direction microphone elements or the like may alternatively be employed in practicing the invention. Of course, the FOG microphone element arrangement would simply replace to two dipoles of the inventive Broadside SOG microphone described above, for example, in FIG. 9, with its two elements. In both of the alternative arrangements, the acoustic transmission lines can be much shorter than those used in the Broadside SOG microphone, and electrical subtractions are employed.

What is claimed is:

1. Apparatus comprising:

a housing having two outer ports and an inner port for admission of acoustic energy, the two outer ports and the inner port being arranged in a non-colinear manner such that the inner port is in a position closer to a prospective talker's lips than the two outer ports;

one microphone element housed in the housing;

a first acoustic transmission line for transporting acoustic energy entering one of the two outer ports to a first position on the one microphone element;

a second acoustic transmission line for transporting acoustic energy entering the other of the two outer ports to said first position on the microphone element; and a third acoustic transmission line for transporting acoustic energy entering the inner port to a second position on the microphone element.

2. The apparatus as defined in claim 1 wherein the microphone element is a first order gradient microphone element having the first and second positions to which the acoustic energy is to be supplied.

3. The apparatus as defined in claim 1 wherein each of the acoustic transmission lines have equal length from their associated ports to the position on the microphone element for transporting the acoustic energy.

4. The apparatus as defined in claim 1 wherein each of the acoustic transmission lines and the associated ports are arranged and dimensioned to yield a fundamental acoustic resonant frequency above 3600 Hz, with no such fundamental acoustic resonant frequency being below 3600 Hz.

5. The apparatus as defined in claim 1 further including an additional inner port for admission of acoustic energy and being arranged in a noncolinear manner with the two outer ports such that both the inner port and the additional inner port are positioned closer to the prospective talker's lips than the two outer ports, and further including a fourth acoustic transmission line, wherein one of the third and the fourth acoustic transmission lines is arranged to transport acoustic energy from the additional port to the second position on the microphone element, and the other of the third and the fourth acoustic transmission lines transporting acoustic energy from the one inner port to the second position on the microphone element.

6. The apparatus as defined in claim 5 wherein the microphone element is a first order gradient microphone element having the first and second positions to which the acoustic energy is to be supplied.

7. The apparatus as defined in claim 5 wherein each of the acoustic transmission lines has equal length from their associated ports to the position on the microphone element to which it is transporting the acoustic energy.

8. The apparatus as defined in claim 5 wherein each of the acoustic transmission lines and its associated port are arranged and dimensioned to yield a fundamental acoustic resonant frequency above 3600 Hz, with no such fundamental acoustic resonant frequency being below 3600 Hz.

9. The apparatus as defined in claim 5 wherein the two outer ports and the inner port and the additional port include four ports including two inner ports comprised of first and second inner ports and two outer ports comprised of first and second outer ports which form a gradient plane pointing substantially toward the prospective talker's lips.

10. The apparatus as defined in claim 9 wherein the two outer ports on the gradient plane are connected to each other by said first and second acoustic transmission lines which form a straight transmission path for transporting the acoustic energy to the second position on the microphone element.

11. The apparatus as defined in claim 9 wherein the gradient plane includes X and Y axes, with the X axis being defined as passing through the two inner ports and the Y being defined as being orthogonal to the X axes.

12. The apparatus as defined in claim 11 wherein the first outer port and the first inner port form a first dipole and the second outer port and the second inner port form a second dipole, each of the dipoles having a dipole axis which passes through the center of the ports forming the dipole.

13. The apparatus as defined in claim 12 wherein an angle between the X axis and the axis of each dipole is greater than zero (0) degrees.

14. The apparatus as defined in claim 12 wherein an angle between the X axis and the axis of each dipole is within the range of 10 to 90 degrees.

15. The apparatus as defined in claim 12 wherein an angle between the X axis and the axis of each dipole is preferably $\beta_p \approx \tan^1(2R/d1) - 27.5$ degrees, where R is a critical distance along the Y axis from the origin on the X axis to the prospective talker's lip position.

16. The apparatus as defined in claim 15 wherein the microphone element is a first order gradient microphone element having the first and second positions to which the acoustic energy is to be supplied.

\* \* \* \* \*